(12) United States Patent
Takada et al.

(10) Patent No.: US 7,354,346 B2
(45) Date of Patent: Apr. 8, 2008

(54) TORQUE LIMITER (75) Inventors: Seiichi Takada, Kuwana (JP); Masaaki Honda, Kuwana (JP); Chikara Katagiri, Kuwana (JP); Takashi Yamamoto, Kuwana (JP)

(73) Assignee: NTN Corporation, Osaka (JP)

( * ) Notice: Subject to any disclaimer, the term of this patent is extended or adjusted under 35 U.S.C. 154(b) by 173 days.

(21) Appl. No.: 11/147,502

(22) Filed: Jun. 8, 2005

(65) Prior Publication Data
US 2005/0282640 A1 Dec. 22, 2005

(30) Foreign Application Priority Data
Jun. 17, 2004 (JP) ............... P2004-179180

(51) Int. Cl.
F16D 7/02 (2006.01)

(52) U.S. Cl. ...................... 464/10

(58) Field of Classification Search .......... 464/10; 508/390
See application file for complete search history.

(56) References Cited
U.S. PATENT DOCUMENTS
6,673,750 B2 * 1/2004 Hirata et al. ............ 508/390 X

FOREIGN PATENT DOCUMENTS

| JP | 05-008062 U | 2/1993 |
|---|---|---|
| JP | 06-235447 | 8/1994 |
| JP | 07-301248 | 11/1995 |
| JP | 08-270675 | 10/1996 |
| JP | 2002-249794 | 9/2002 |
| JP | 2002-348688 | 12/2002 |

* cited by examiner

Primary Examiner—Greg Binda
(74) Attorney, Agent, or Firm—Hedman & Costigan (57) ABSTRACT A torque limiter comprising an inner ring fitted inside an outer member; and a torque transmission member interposed between said inner ring and said outer member. A predetermined torque is generated by a friction generated between said inner ring and said torque transmission member, when said inner ring and said outer member rotate relatively to each other. The members are impregnated with lubricating oil to slide said members on each other. The lubricating oil contains a base oil consisting of synthetic saturated hydrocarbon oil having a kinematic viscosity of 500 to 1200 mm$^2$/s at 40° C. and an emulsifier added to said base oil. The lubricating grease contains the base oil consisting of the synthetic saturated hydrocarbon oil having a kinematic viscosity of 500 to 1200 mm$^2$/s at 40° C. and an emulsifier and a thickener both added to said base oil.

10 Claims, 6 Drawing Sheets

TORQUE LIMITER

BACKGROUND OF THE INVENTION

The present invention relates to a torque limiter for use in office appliances and the like. More particularly, the present invention relates to a torque limiter which generates a torque stably without little fluctuation and lengthens the life of a bearing without being affected adversely by an environment having a high temperature and a high humidity in which it is difficult to lubricating the torque limiter.

The torque limiter is classified into two types. In one type, a binding force is applied to an inner ring in a radial direction to generate a torque. In the other type, a spring is used to slidably contact one friction plate with other friction plate, with the one friction plate being pressed against the other friction plate in a thrust direction to generate a torque. In both types, the torque is generated by a frictional force. Many prior arts of the torque limiter are known (for example, Japanese Patent Application Laid-Open Nos. 8-270675, and 7-301248, 6-235447 and Japanese Utility Model Laid-Open No.5-8062).

Lubricating oil or lubricating grease is used to prevent a wear from occurring between the inner ring of the torque limiter and the spring thereof or the friction plate and between the friction plates, an abnormal heat generation, and an abnormal sound generated by seizure. The inner ring of the torque limiter is made of sintered metal and impregnated with the lubricating oil to use the inner ring as a lubricating mechanism.

The lubricating oil and the lubricating grease for use in the torque limiter frequently contain mineral oil, an aromatic compound and ester as the base oil thereof and additives such as a wear-resistant agent added to the base oil in dependence on use. The torque limiter is required to have the performance of retaining and maintaining an oil film for a long time by preventing contact between metals and stabilizing friction coefficients thereof. In the torque limiter for use in a paper transport apparatus of a copying machine, a printer, and the like and a mechanism for tensioning a ribbon or a sheet, there is a demand for the development for a lubricating agent allowing a torque to fluctuate little and preventing sounds from being generated by contact between the metals.

There is a demand that office appliances such as the copying apparatus using the torque limiter can be reliably used in different environments. There is also a demand for the development of lubricating oil allowing the torque to fluctuate little and preventing sounds from being generated by the contact between the metals in an environment having a high temperature and a high humidity (for example, 40° C. and relative humidity (RH) in the neighborhood of 90%) environment where it is difficult to form an oil film.

Resin such as polycarbonate resin or ABS resin having a high processability is used for parts on the periphery of the torque limiter. Thus the parts made of the resin are cracked, broken or the surfaces thereof may become rough, i.e., a so-called chemical attacking phenomenon may occur owing to contact between the parts made of the resin and lubricating oil, for use in the torque limiter, which has leaked from the torque limiter or between the parts made of the resin and the vapor of the lubricating oil. For example, the lubricating oil using ester or an aromatic compound as its base oil has a high oil film-forming performance and satisfies the torque performance necessary for the torque limiter to perform. But the lubricating oil containing the base oil, whose molecules have aromatic rings and polar groups, as its main component is liable to chemically attack the parts made of the resin. The ester-containing base oil is apt to be hydrolyzed in an environment having a high temperature and a high humidity.

To prevent the lubricating oil from chemically attacking the members made of resin, conventionally known is a rust-proof oil containing the rust-proof agent and the antioxidant both added to the base oil, as disclosed in Japanese Patent Application Laid-Open No.2002-348688. The base oil contains polyolefin oil. The rust-proof agent is at least one kind of metallic salt selected from among metallic salts of sulfonic acid and metallic salts of monocarboxylic acid. The antioxidant is a phenolic antioxidant.

As the lubricating oil or the lubricating grease, for the torque limiter, which generates a torque which fluctuate little and allows the torque limiter to have a long life by preventing contacts of metals which occur owing to breakage of an oil film and which does not chemically attack resin, the lubricating oil impregnating a bearing therewith or the lubricating grease disclosed in Japanese Patent Application Laid-Open No.2002-249794 contains the base oil consisting of the compound of synthetic saturated hydrocarbon and at least one kind of phosphate ester selected from among aliphatic phosphate and aliphatic phosphite. The phosphate ester is contained at 1 to 8 wt % for the total weight of the lubricating oil.

Utilizing a torque generated by the torque limiter, the torque limiter is used as a part of a paper supply mechanism of a copying apparatus and a printer. In an environment having a high temperature and a high humidity, the viscosity of the lubricating oil lowers, the thickness of an oil film on members of the torque limiter decreases, and water in the air penetrates into the lubricating oil in the form of droplets and into the lubricating surface. Thereby the oil film is broken in a short period of time, thus causing the torque limiter to chatter (abnormal torque) and thus the paper supply function to deteriorate. The torque limiter is liable to chatter in an environment having a high humidity in the neighborhood of the dew point temperature.

SUMMARY OF THE INVENTION

It is an object of the present invention to provide a torque limiter, for use in office appliances, which generates a torque fluctuating little in an environment having a high temperature and a high humidity, allows a bearing to have a long life by preventing contacts of metals which occur owing to breakage of an oil film, and does not chemically attack members made of resin.

One embodiment of the torque limiter of the present invention includes an inner ring fitted inside an outer member and a torque transmission member interposed between the inner ring and the outer member. A predetermined torque is generated by a friction generated between the inner ring and the torque transmission member, when the inner ring and the outer member rotate relatively to each other. The members are impregnated with lubricating oil to slide the members on each other. The lubricating oil contains a base oil consisting of synthetic saturated hydrocarbon oil having a kinematic viscosity of 500 to 1200 mm.sup.2/s at 40.degree. C. and an emulsifier added to the base oil.

A further embodiment of the torque limiter of the present invention includes an inner ring fitted inside an outer member and a torque transmission member interposed between the inner ring and the outer member. A predetermined torque is generated by a friction generated between the inner ring and the torque transmission member, when the inner ring and the outer member rotate relatively to each other. The members are impregnated with lubricating grease to slide the members on each other. The lubricating grease contains a base oil consisting of synthetic saturated hydrocarbon oil having a kinematic viscosity of 500 to 1200 mm.sup.2/s at 40.degree. C. and an emulsifier and a thickener both added to the base oil.

The emulsifier contained in the lubricating oil or the lubricating grease for use in the torque limiter of the present invention is a metallic salt of sulfonic acid. The emulsifier is added to the base oil of the lubricating oil or the lubricating grease as a solution dissolved in a solvent not generating a chemical attacking property.

In the torque limiter of the present invention, as the lubricating oil or the lubricating grease impregnating the torque limiter therewith, the synthetic saturated hydrocarbon oil having a kinematic viscosity of 500 to 1200 mm$^2$/s at 40° C. is used as the base oil of the lubricating oil or the lubricating grease, and the metallic salt of the sulfonic acid is used as the emulsifier. Therefore droplets that penetrate into the lubricating agent are formed into very fine droplets with the emulsifier. Further owing to a high viscosity of the base oil, the oil film can be prevented from being broken. Furthermore since the lubricating oil or the lubricating grease contains the synthetic saturated hydrocarbon oil and the metallic salt of sulfonic acid as its main component, it is possible to use a small amount of additives containing polar components for the lubricating oil or the lubricating grease. Thereby the lubricating oil or the lubricating grease is excellent because it does not chemically attack resin materials. Therefore the torque limiter generates a torque that fluctuates little, i.e., provides a stable torque in the environment having a high temperature and a high humidity.

DETAILED DESCRIPTION OF THE PREFERRED EMBODIMENTS

The base oil which can be used for the lubricating oil of the present invention or the lubricating grease thereof is synthetic saturated hydrocarbon oil. Of the synthetic saturated hydrocarbon oil, oligomers of α-olefin are preferable. For example, polymers or copolymers of the α-olefin, having 3 to 20 carbon atoms, such as butane-1, isobutylene-1, α-octane, and decane-1 can be preferably used. These oligomers are liquid at the normal temperature. As the copolymers of the α-olefin, copolymers of ethylene and α-olefin can be preferably used.

As the preferable base oil, it is possible to use poly-α-olefin shown by a chemical formula 1 shown below and a hydrogenated ethylene-α-olefin copolymer shown by a chemical formula 2. As the poly-α-olefin, hydrogenated oligomers of the α-olefin having 6 to 18 carbon atoms is preferably used. As the ethylene-α-olefin copolymer, hydrogenated copolymers of ethylene and the α-olefin having 3 to 10 carbon-atoms is preferably used.

Chemical formula 1 where n is integers 4 through 16, and m is integers 1 through 6.

Chemical formula 2 where n is integers 1 through 8, m is integers 1 through 3, q is integers 1 through 3, and p is integers different according to the viscosity of polyolefin oil.

To allow the torque limiter to generate a stable torque with fine droplets emulsified in the lubricating oil or in the lubricating grease in a high-humidity environment in which dew condenses, the kinematic viscosity of the polyolefin oil used as the base oil at 40° C. is 500 to 1200 mm$^2$/s and favorably 700 to 900 mm$^2$/s. If the kinematic viscosity of the polyolefin oil is below 500 mm$^2$/s, an oil film is liable to be broken in a high-temperature and high-humidity environment in which fine droplets are emulsified. If the kinematic viscosity exceeds 1200 mm$^2$/s, an initial decrease amount of the torque becomes large.

As the above-described base oil, the poly-α-olefin can be preferably used. A mixture of two or more poly-α-olefins having different viscosities can be used to allow the base oil to have a predetermined viscosity. But it is preferable to use the poly-α-olefin singly.

Because the above-described base oil has a high viscosity, it has a high oil film-forming performance. Therefore the above-described base oil has a high effect of restraining the torque limiter from chattering and a bearing from being worn, thereby lengthening the life of the bearing. The base oil is excellent in chemical non-attacking property. More specifically, when the composition of the lubricating oil leaks to the outside of the torque limiter for some reason or contacts members made of synthetic resin disposed on the periphery thereof, the composition of the lubricating oil does not chemically attack them.

In the present invention, it is possible to use an emulsifier capable of emulsifying fine droplets mixed with the synthetic saturated hydrocarbon oil in an environment having a high humidity in which dew condensates. As a preferable emulsifier, it is possible to use a metallic salts of sulfonic acid shown by a chemical formula 3 shown below.

Chemical formula 3

In the chemical formula 3, reference symbol R denotes an alkyl group, an alkenyl group, and alkyl benzene; and reference symbol M denotes metal. The alkali earth metal or the alkali metal is preferable as the metal. More specifically, it is possible to exemplify calcium, barium, magnesium, and potassium. Reference symbol n denotes 1 or 2. In the present invention, it is possible to use two or more metallic salts of sulfonic acid in combination.

The emulsifier is demanded to have the effect of preventing the breakage of the oil film by promptly emulsifying water which has penetrated into the lubricating agent. To comply with the demand, the molecule of the emulsifier is required to have a structure having a hydrophobic group having a proper molar amount and a hydrophilic group having a high polarity. When water is present in the lubricating agent having a low viscosity, it has a low oil film-forming performance. Therefore the oil film is broken by the influence of the emulsified water. However, when water is present in the lubricating agent having a high viscosity, it has a high oil film-forming performance. Therefore the oil film is little influenced by the emulsified water, and thus the breakage of the oil film hardly occurs.

As the addition amount of the metallic salt of sulfonic acid serving as the emulsifier, it is favorable to add 0.5 to 12 wt % thereof to the total weight of the base oil. If the addition amount of the metallic salt of sulfonic acid is less than 0.5 wt %, it does not have emulsifiable effect. On the other hand, if the addition amount thereof is more than 12 wt %, the metallic salt of sulfonic acid adversely affects the solubility thereof for the base oil, the stability of the torque, and the property of the chemical non-attacking property of the lubricating oil or the lubricating grease. Considering the performance of the torque limiter and the property of the chemical non-attacking property of the lubricating oil or the lubricating grease in the environment having a high humidity, it is more favorable to add 1 to 8 wt % of the metallic salt of sulfonic acid to the base oil.

It is preferable that the metallic salt of sulfonic acid is dissolved in a solvent excellent in the chemical non-attacking property which will be described later to allow the metallic salt of sulfonic acid to be compatible with other oils and additives and accelerate emulsification. As solvents excellent in the chemical non-attacking property, non-polarized solvents are preferable. For example, it is possible to use mineral oil or synthetic saturated hydrocarbon oil.

The metallic salt of sulfonic acid is dissolved at 20 to 80 wt % and favorably 30 to 70 wt % in a solution of the mineral oil or in a solution of the synthetic saturated hydrocarbon oil. Therefore the addition amount of the solution of the metallic salt of sulfonic acid and the mineral oil or the like is 2.5 to 15 wt % for the total weight of the base oil.

In the present invention, a thickener is added to the lubricating oil essentially containing the base oil and the metallic salt of sulfonic acid serving as the emulsifier to use the lubricating oil as a lubricating grease.

The thickener added to the lubricating oil disperses semi-solidly in the base oil and takes a micellar structure. As the thickener, the following substances can be used: metal soaps such as sodium soap, lithium soap, calcium soap, barium soap, calcium complex soap, aluminum complex soap, lithium complex soap, barium complex soap; inorganic substances such as Penton, silica aerogel, sodium terephthalate, urea, polytetrafluoroethylene, hidroxyapatite, polyethylene powder; and non-soaps such as urea compounds, waxes, and the like. It is preferable to use urea compounds and lithium soaps having performance balanced among mechanical stability, resistance to heat, and resistance to water as the thickener.

Phosphate ester can be contained in the lubricating oil or the lubricating grease of the present invention as a wear-resistant agent.

As the phosphate ester, a substance shown by a chemical formula 4 shown below is used.

Chemical formula 4

In the chemical formula 4, reference symbol R denotes an alkyl group, an alkenyl group or aryl group.

The phosphate ester serving as the wear-resistant agent is contained in the lubricating oil at 1 to 8 wt % for the total weight of the lubricating oil. When the addition amount of the phosphate ester is less than 1 wt %, the phosphate ester does not have an effect of decreasing wear and improving the stability of the torque. On the other hand, if the addition amount thereof is more than 8 wt %, the phosphate ester gives a bad influence on the chemical non-attacking property of the lubricating oil. Considering the performance of the torque limiter and the chemical non-attacking property of the lubricating oil, it is more favorable to use 3 to 5 wt % of the phosphate ester for the total weight of the lubricating oil.

An example of the torque limiter of the present invention for which the above-described lubricating oil 5 or the lubricating grease 6 is used will be described below. The lubricating oil 5 or the lubricating grease 6 is used to prevent wear from occurring between an inner ring of the torque limiter and a spring thereof or a friction plate thereof, between the friction plates, or an abnormal heat generation, and an abnormal sound generation caused by seizure.

Figure 1:
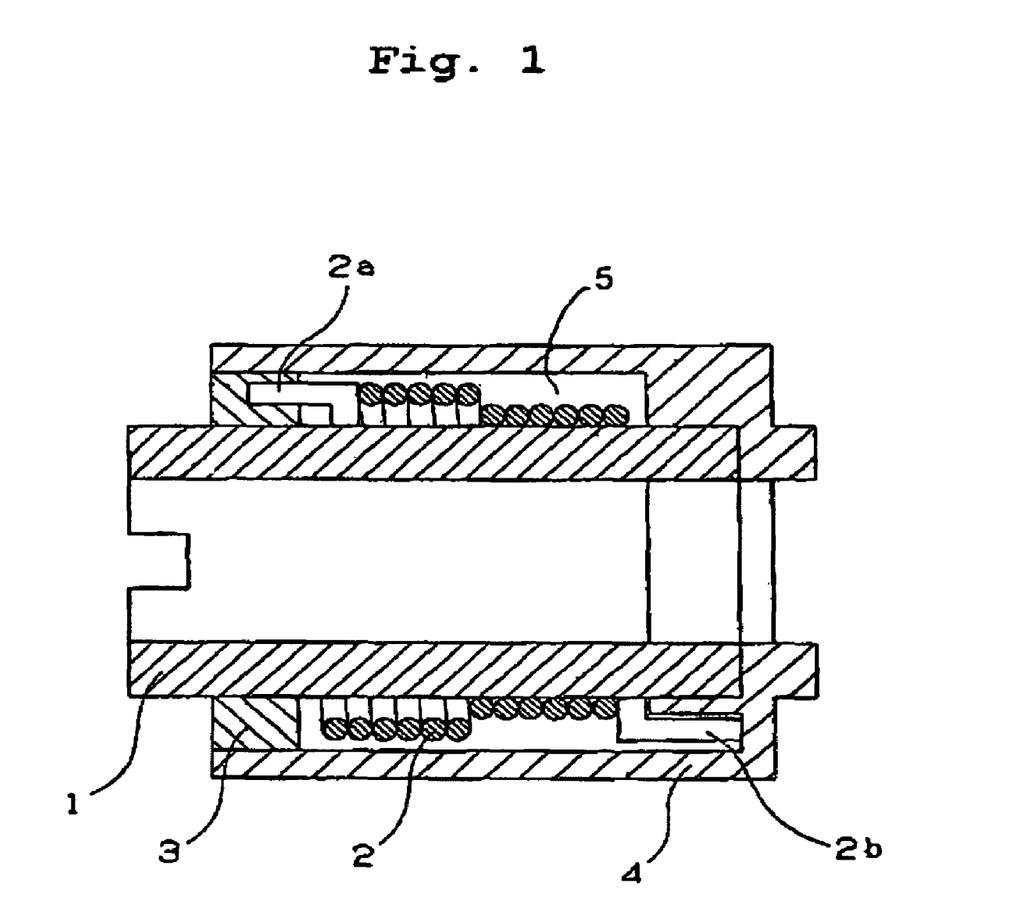
FIG. 1 is a sectional view showing an example of a torque limiter.

A torque limiter shown in FIG. 1 is of a friction type generating a torque by a binding force applied to an inner ring 1 made of metal by a coil spring 2 having a large-diameter portion and a small-diameter portion. The coil spring 2 is provided on the outer side of the inner ring 1. The coil spring 2 is locked to a cover 3 and hood 4 through hooks 2a and 2b. By rotating the cover 3 inserted into the hood 4 by press fit, the binding force applied to the inner ring by the coil spring 2 changes successively. Lubricating oil 5 is provided between inner ring 1 and outer ring 2. Thereby the torque can be freely adjusted. The rotational direction of the inner ring 1 is limited to one direction in dependence on a winding direction of the coil spring 2.

Figure 2:
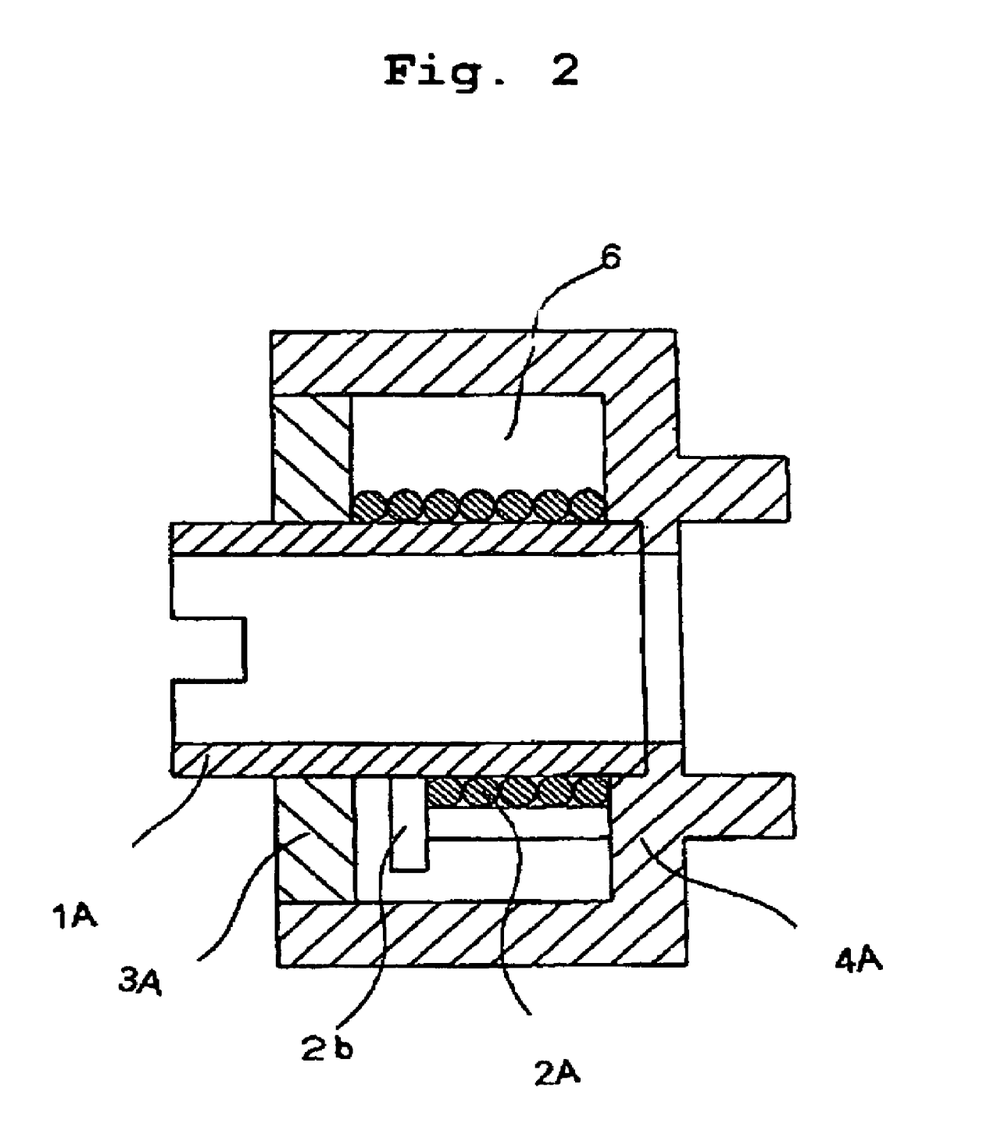
FIG. 2 is a sectional view showing another example of the torque limiter.

In a torque limiter as shown in FIG. 2, a cylindrical coil spring 2A is provided on the outer side of an inner ring 1A made of metal. Lubricating grease 6 is provided between inner ring 1A and outer ring 2A. The coil spring 2A is locked to a cover 3A. The coil spring 2A is locked to a hood 4A through a hook 2b of the coil spring 2A. Because the coil spring 2A is cylindrical, it is incapable of adjusting the torque but by using as the coil springs 2A, springs having different interferences for the inner ring in combination, the binding force applied to the inner ring 1A by the coil spring 2A changes, and the value of the torque is determined. In this manner, the torque can be adjusted. In the torque limiter having the above described configuration, the rotational direction of the inner ring 1A is limited to one direction in dependence on a winding direction of the coil spring 2A. Lubricating grease 6 is provided between inner ring 1A and outer ring 2A.

Figure 3:
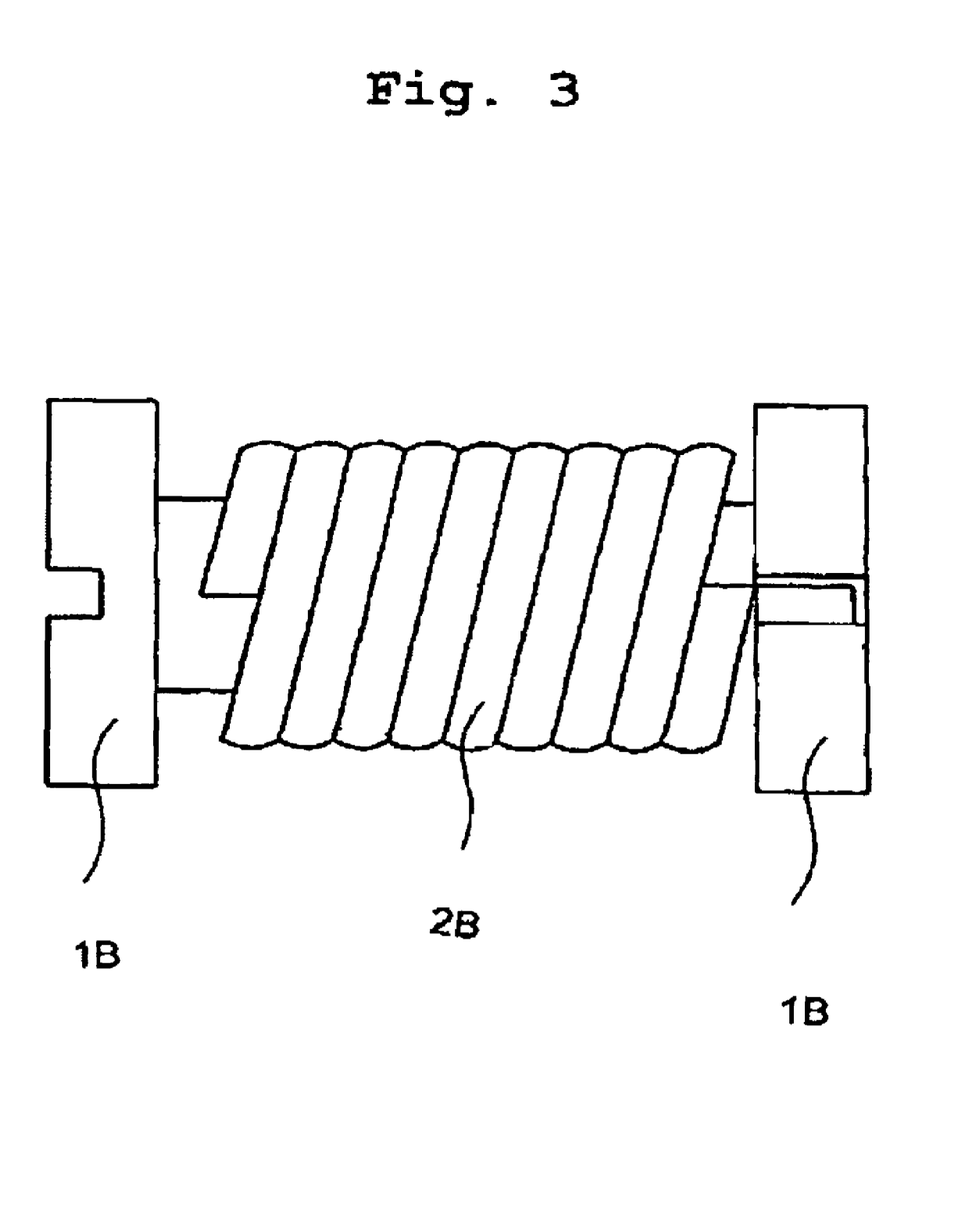
FIG. 3 is a sectional view showing another example of the torque limiter.

In a torque limiter shown in FIG. 3, as in the case of the torque limiter shown in FIG. 2, a cylindrical coil spring 2B is provided on the outer side of a separate-type inner ring 1B made of metal. Because the coil spring 2B is cylindrical, it is incapable of adjusting the torque. But in dependence on the interference of the coil spring 2B for the inner ring 1B, the value of the torque is determined. In the torque limiter having the above-described configuration, the rotational direction of the inner ring 1B is limited to one direction in dependence on a winding direction of the coil spring 2B.

Figure 4:
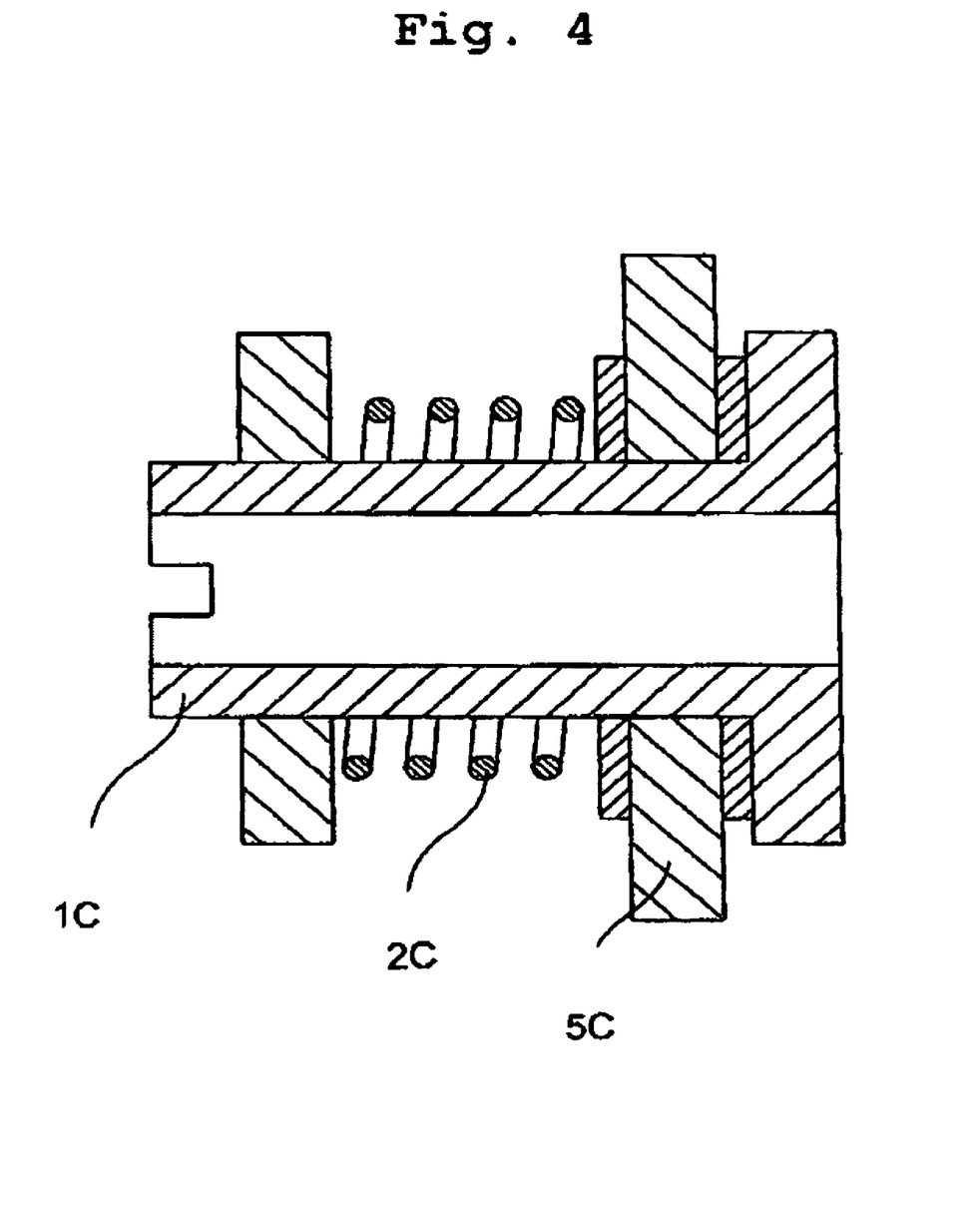
FIG. 4 is a sectional view showing another example of the torque limiter.

In a torque limiter shown in FIG. 4, a friction plate 5C is pressed against an inner ring 1C made of metal by a spring 2C. A torque is generated by a frictional force acting between the inner ring 1 and the friction plate 5C. Because the frictional force can be changed in dependence on a pressing force, the torque can be adjusted. In the torque limiter having the above-described configuration, the rotational direction of the inner ring 1C does not depend on the winding direction of the coil spring 2C.

The lubricating oil and the lubricating grease for use in the torque limiter of the present invention are described below. The components used in the examples and the comparison examples are abbreviated as shown below. Mixing ratios of the components are shown by wt %. The components EM1 through EM3 were used as solutions.

PAO1: poly-α-olefin oil (kinematic viscosity at 40° C.: 200 mm²/s)

PAO2: poly-α-olefin oil (kinematic viscosity at 40° C.: 900 mm²/s)

TCP: tricresyl phosphate

EM1: emulsifier 1 consisting of metallic salt of sulfonic acid (Through-hole CA-45N contained at 45 wt % as metallic salt of sulfonic acid)

EM2: emulsifier 2 consisting of metallic salt of sulfonic acid (Through-hole BA-30N contained at 31 wt % as metallic salt of sulfonic acid)

EM3: emulsifier 3 consisting of metallic salt of sulfonic acid (Through-hole 400 contained at 62 wt % as metallic salt of sulfonic acid)

The components were mixed at the ratios shown in tables 1 and 2 to manufacture the lubricating composition of each of the examples and the comparison examples. Table 1 shows examples of oily lubricating oils. Table 2 shows examples of lubricating greases containing lithium soap (20 wt % is used for total weight of grease) used as the thickener. Reference symbol "Bal" shown in tables 1 and 2 indicates a remaining amount (wt %) other than the addition of numerical values (wt %) of components.

TABLE 1

| | Base oil | | Emulsifier | | | |
|---|---|---|---|---|---|---|
| | PAO 1 | PAO 2 | EM 1 | EM 2 | EM 3 | TCP |
| Example | | | | | | |
| 1 | 0 | Bal | 5 | 0 | 0 | 5 |
| 2 | 0 | Bal | 0 | 5 | 0 | 5 |
| 3 | 0 | Bal | 0 | 3 | 0 | 1 |
| 4 | 0 | Bal | 0 | 15 | 0 | 8 |
| 5 | 0 | Bal | 0 | 0 | 5 | 5 |
| 6 | 0 | Bal | 3 | 0 | 0 | 5 |
| 7 | 0 | Bal | 0 | 3 | 0 | 5 |
| 8 | 0 | Bal | 15 | 0 | 0 | 8 |
| 9 | 0 | Bal | 0 | 15 | 0 | 5 |
| 10 | 0 | Bal | 0 | 0 | 15 | 5 |
| Comparative Example | | | | | | |
| 1 | Bal | 0 | 5 | 0 | 0 | 5 |
| 2 | Bal | 0 | 0 | 5 | 0 | 5 |
| 3 | Bal | 0 | 3 | 0 | 0 | 1 |
| 4 | Bal | 0 | 15 | 0 | 0 | 8 |
| 5 | 100 | 0 | 0 | 0 | 0 | 0 |
| 6 | Bal | 0 | 0 | 0 | 0 | 5 |
| 7 | Bal | 0 | 3 | 0 | 0 | 5 |
| 8 | Bal | 0 | 0 | 3 | 0 | 5 |
| 9 | Bal | 0 | 15 | 0 | 0 | 5 |
| 10 | Bal | 0 | 0 | 15 | 0 | 5 |
| 11 | Bal | 0 | 0 | 0 | 5 | 5 |
| 12 | Bal | 0 | 16 | 0 | 0 | 0.8 |
| 13 | Bal | 0 | 5 | 0 | 0 | 9 |

TABLE 2

| | Base oil | | Emulsifier | | | |
|---|---|---|---|---|---|---|
| | PAO 1 | PAO 2 | EM 1 | EM 2 | EM 3 | TCP |
| Example | | | | | | |
| 11 | 0 | Bal | 0 | 3 | 0 | 1 |
| 12 | 0 | Bal | 15 | 0 | 0 | 8 |
| 13 | 0 | Bal | 0 | 15 | 0 | 8 |
| 14 | 0 | Bal | 0 | 3 | 0 | 5 |
| 15 | 0 | Bal | 0 | 15 | 0 | 5 |
| Comparative Example | | | | | | |
| 14 | Bal | 0 | 5 | 0 | 0 | 5 |
| 15 | Bal | 0 | 0 | 5 | 0 | 5 |
| 16 | Bal | 0 | 3 | 0 | 0 | 1 |
| 17 | 100 | 0 | 0 | 0 | 0 | 0 |
| 18 | Bal | 0 | 3 | 0 | 0 | 5 |
| 19 | Bal | 0 | 15 | 0 | 0 | 5 |
| 20 | Bal | 0 | 0 | 0 | 5 | 5 |
| 21 | Bal | 0 | 5 | 0 | 0 | 5 |
| 22 | Bal | 0 | 16 | 0 | 0 | 0.8 |
| 23 | Bal | 0 | 5 | 0 | 0 | 9 |

The lubricating oil and the lubricating grease were evaluated by the following method. The results are shown in tables 3 and 4.

<Test for Examining Stability of Torque>

Figure 5:
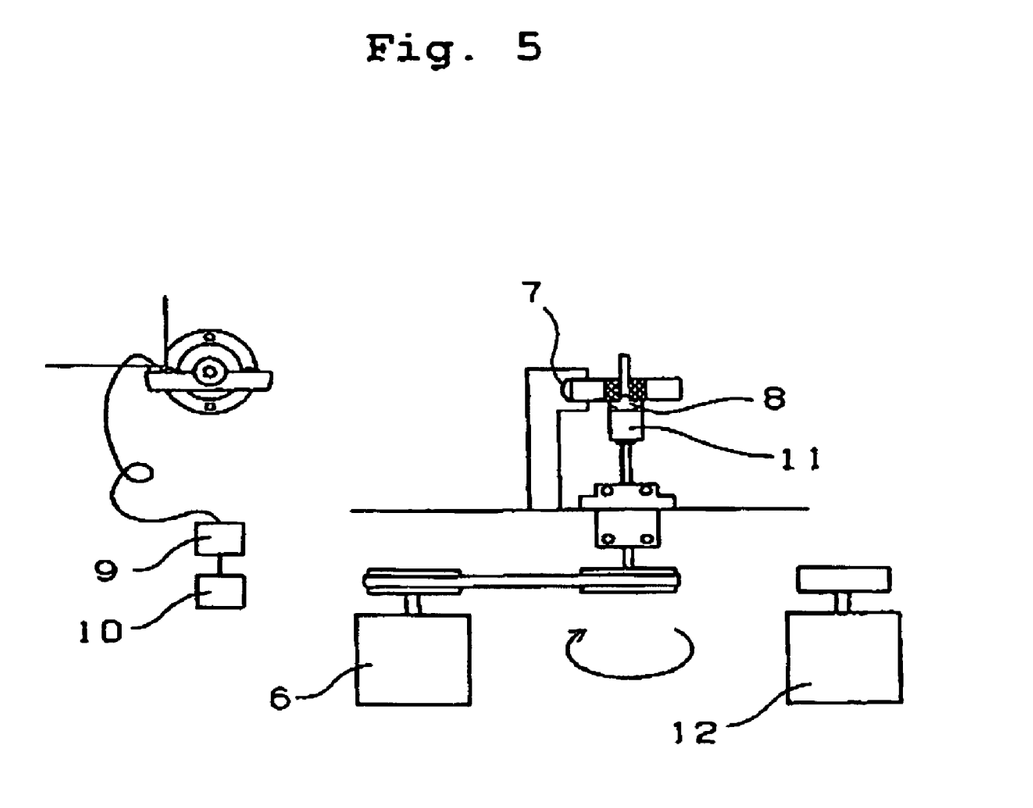
FIG. 5 is an illustration for explaining the stability of a torque.

The tester used was manufactured by the present applicant's company. The torque limiter NTS18 used for the evaluation was manufactured by the present applicant's company. FIG. 5 is an explanatory view for explaining the construction of a tester for examining the stability of the torque. The tester had a motor 6 for rotating the shaft, a torque detection load cell 7, a coupling 8, a strain meter 9, and a recording meter 10. A torque limiter 11 having a sintered inner ring impregnated with each sample oil was set for the rotational shaft. By rotating the inner ring in the direction in which a torque was generated by the torque limiter, the generated torque was transmitted to the load cell 7 and recorded by the recording meter 10. A low-speed motor 12 is switched to a high-speed motor 6 or vice versa. The drawing at the left-hand side of FIG. 5 is seen from above.

The test conditions were set as follows: set torque: 500 gf·cm, number of rotations: 50 rpm, drive cycle: intermittent cycle of drive for 15 seconds and stop for one second, atmospheric temperature: 40° C., humidity: 90%, and period of time in which test was conducted: 400 hours. The following items were measured: feeling of touch on each specimen torque limiters after the test finished; a change of the torque (change with time, fluctuation of torque in one minute) examined at zero hour and at intervals of 200 hours and 400 hours; and whether the torque limiter chattered during the drive of the tester. The torque was measured at zero hour and at the predetermined intervals of 200 hours and 400 hours by the tester shown in FIG. 5. Reference symbols ○ and X shown in table 3 indicate the result in the test for examining the stability of the torque. Torque limiters which decreased the torque at not more than 30 gf·cm in one minute were marked by ○, whereas torque limiters which decreased the torque at more than 30 gf·cm in one minute were marked by X. Torque limiters which gave a good feeling to an examiner in the touch were marked by ○, whereas the torque limiters which gave a bad feeling to the examiner in the touch were marked by X.

<Test for Examining Chemical Non-attacking Property>

PC (polycarbonate) resin or ABS resin having a high processability is used for parts disposed on the periphery of the torque limiter. Thus there is a possibility that the parts, made of the PC resin or the ABS resin, are cracked or broken owing to contact between the parts and the lubricating oil or the lubricating grease, for use in the torque limiter, which has leaked from the torque limiter. To confirm the chemical-non-attacking property of the lubricating oil of the present invention, the test for examining the chemical non-attacking property was conducted by using the PC and the ABS resin.

The chemical non-attacking property can be evaluated by carrying out a bending test method. In conducting the bending test, the lubricating grease is applied to the surface of a plate made of the polycarbonate resin and to a plate made of the ABS resin. After a mechanical stress is applied to the plates, the surface of each of the plates is observed.

The method of conducting the bending test is described below.

(1) Apparatus for Conducting the Bending Test

Figure 6:
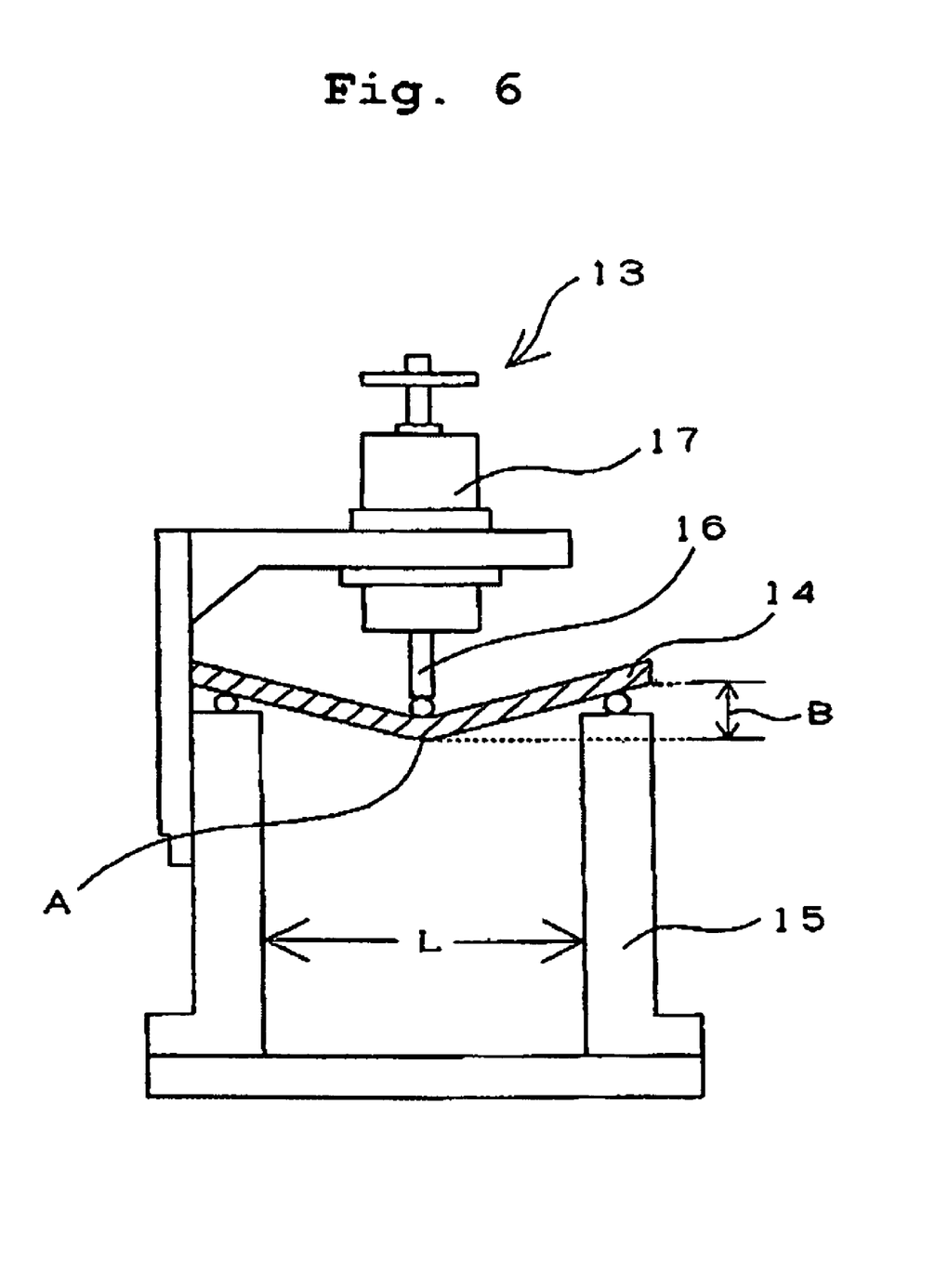
FIG. 6 is an illustration showing an apparatus for examining a bending test.

FIG. 6 illustrates an apparatus for carrying out the bending test.

A bending apparatus 13 has a specimen 14 whose both ends are movably supported by spacing both ends at a predetermined distance L, a test base 15 on which the specimen 14 can be placed, a probe 16 for giving a flexed amount (B) to the specimen 14, a flexed amount adjusting device 17 supporting the probe 16 to allow the probe 16 to move forward and rearward.

(2) Test Condition
Specimen to be bent: 127 mm (length)×12.7 mm (width)× 6.5 mm (thickness)
Distance between specimen-supporting points: 100 mm
Flexed amount of specimen (flexed amount of portion disposed at center between specimen-supporting points): 3.5 mm
Temperature: 70° C.
Time period in which specimen was held: three hours
Material 1 of specimen: Yupiron S2000R (PC resin produced by Mitsubishi Engineering Plastics Inc.)
Material 2 of specimen: Styluck 321 (ABS resin produced by Asahi Kasei Inc.)

(3) Test Method

A three-point bending test was conducted. Lubricating oil or lubricating grease was applied to the surface of the specimen to be bent which underwent annealing treatment at 120° C. for two hours. The specimen supported at two points spaced at the predetermined distance was flexed in an amount by applying a force to the rear surface thereof. The specimen was held in the air at 75° C. for three hours. Whether the specimen cracked was checked visually. The specimen which was not cracked was marked by "○", whereas the specimen which was cracked was marked by X.

<Emulsifiability Test)

An emulsifiability test was conducted in accordance with JIS K 2520. The lubricating oil for use in the torque limiter and water were mixed with each other at 1:1 in a weight ratio and stirred to measure an emulsified degree of the water in the lubricating oil in each specimen. Regarding the lubricating grease for use in the torque limiter, the emulsified degree of the water in the base oil was measured in each specimen. The specimen in which the water emulsified in the lubricating oil or in the base oil was marked by "○", whereas the specimen in which the water and the lubricating oil separated from each other is marked by X.

TABLE 3

| | Test for examining torque stability | | | | Test for examining chemical non-attacking property | | Emulsifiability |
|---|---|---|---|---|---|---|---|
| | Time elapsed (hour) | | | Feeling of touch | PC | ABS | |
| | 0 | 200 | 400 | | | | |
| Example | | | | | | | |
| 1 | ○ | ○ | ○ | ○ | ○ | ○ | ○ |
| 2 | ○ | ○ | ○ | ○ | ○ | ○ | ○ |
| 3 | ○ | ○ | x | ○ | ○ | ○ | ○ |
| 4 | ○ | ○ | ○ | ○ | ○ | ○ | ○ |
| 5 | ○ | ○ | ○ | ○ | ○ | ○ | ○ |
| 6 | ○ | ○ | ○ | ○ | ○ | ○ | ○ |
| 7 | ○ | ○ | ○ | ○ | ○ | ○ | ○ |
| 8 | ○ | ○ | ○ | ○ | ○ | ○ | ○ |
| 9 | ○ | ○ | ○ | ○ | ○ | ○ | ○ |
| 10 | ○ | ○ | ○ | ○ | ○ | ○ | ○ |
| Comparative Example | | | | | | | |
| 1 | ○ | ○ | ○ | x | ○ | ○ | ○ |
| 2 | ○ | ○ | ○ | x | ○ | ○ | ○ |
| 3 | ○ | x | x | x | ○ | ○ | ○ |
| 4 | ○ | ○ | ○ | x | ○ | ○ | ○ |
| 5 | ○ | x | x | x | ○ | ○ | x |
| 6 | ○ | ○ | ○ | x | ○ | ○ | x |
| 7 | ○ | ○ | x | x | ○ | ○ | ○ |
| 8 | ○ | ○ | x | x | ○ | ○ | ○ |
| 9 | ○ | ○ | ○ | x | ○ | ○ | ○ |
| 10 | ○ | x | x | x | ○ | ○ | ○ |

TABLE 3-continued

| | Test for examining torque stability | | | Feeling of touch | Test for examining chemical non-attacking property | | Emulsifiability |
|---|---|---|---|---|---|---|---|
| | Time elapsed (hour) | | | | | | |
| | 0 | 200 | 400 | | PC | ABS | |
| 11 | o | o | x | x | o | o | o |
| 12 | o | x | x | x | x | x | o |
| 13 | o | o | o | x | x | x | o |

TABLE 4

| | Test for examining torque stability | | | Feeling of touch | Test for examining chemical non-attacking property | | Emulsifiability |
|---|---|---|---|---|---|---|---|
| | Time elapsed (hour) | | | | | | |
| | 0 | 200 | 400 | | PC | ABS | |
| Example | | | | | | | |
| 11 | o | o | x | o | o | o | o |
| 12 | o | o | o | o | o | o | o |
| 13 | o | o | o | o | o | o | o |
| 14 | o | o | o | o | o | o | o |
| 15 | o | o | o | o | o | o | o |
| Comparative Example | | | | | | | |
| 14 | o | o | o | x | o | o | o |
| 15 | o | o | o | x | o | o | o |
| 16 | o | x | x | x | o | o | o |
| 17 | o | x | x | x | o | o | x |
| 18 | o | o | o | x | o | o | o |
| 19 | o | o | o | x | o | o | o |
| 20 | o | o | o | o | o | o | o |
| 21 | o | o | x | x | o | o | o |
| 22 | o | x | x | x | x | x | o |
| 23 | o | o | o | x | x | x | o |

As indicated in the examples shown in tables 3 and 4, it is necessary to use a required amount of the emulsifier and the base oil (viscosity: 900 mm²/S) consisting of the compound of the synthetic saturated hydrocarbon excellent in the chemical non-attacking property so that the torque limiter can maintain a preferable torque performance in an environment having a high temperature and a high humidity and is excellent in its chemical non-attacking property. It is preferable to use the phosphate ester as the wear-resistant agent of the lubricating oil or the lubricating grease.

The result of the test for examining the torque stability indicates that it is necessary to emulsify water in the base oil which has attached to the surface of a bearing to allow the torque limiter to generate a stable torque in an environment having a high humidity. The test result also indicates that the emulsifier found in the present invention is greatly concerned with the action of emulsifying water in the base oil. In the specimens of the comparison examples 5, 6, and 17 not containing the emulsifier, water which could not be emulsified penetrated into the base oil to generate the breakage of the oil film. Thereby the torque limiter had a failure. As shown in the comparison examples, when the viscosity of the base oil is low, the oil film-forming performance is low, even though the emulsifier is added to the base oil at 3 to 15 wt % as a solution. Thus even though the water penetrates into the base oil and is emulsified, the torque limiter chatters. When the emulsifier is added to the base oil at not less than 15 wt % as a solution, a problem occurs in the solubility of the emulsifier in the base oil and in a long-time stability of the torque. Consequently the emulsifier adversely affects the chemical non-attacking property (comparison examples 12, 22). As described above, the optimum amount of the phosphate ester serving as the wear-resistant agent to be used for the total weight of the lubricating oil is 1 to 8 wt %. If the addition amount of the phosphate ester is below 1 wt %, the lubricating oil or the lubricating grease provides an insufficient torque-stabilizing effect. If the addition amount of the phosphate ester exceeds 8 wt %, the phosphate ester affects the chemical non-attacking property of the lubricating oil or the lubricating grease adversely (comparison examples 13, 23).

The above-described results indicate that as the lubricating oil or the lubricating grease, for use in the torque limiter, which allows the torque limiter to generate a torque stably in the environment having a high temperature and a high humidity and which has an excellent chemical non-attacking property, it is preferable to use the compound of the synthetic saturated hydrocarbon as the base oil, use 1 to 8 wt % of the phosphate ester for 100 wt % of the base oil, and as the emulsifier, use 3 to 15 wt % of the metallic salt of sulfonic acid for 100 wt % of the base oil.

The torque limiter of the present invention generates a stable torque that fluctuates little in the environment having a high temperature and a high humidity. Further since the lubricating oil or the lubricating grease having an excellent chemical non-attacking property is used for the torque limiter, the torque limiter can be preferably used in the environment having a high temperature and a high humidity in which it is difficult to lubricate the torque limiter.

What is claimed is:

1. A torque limiter for use in office appliances in an environment having a high temperature and a high humidity, having an inner ring fitted inside an outer member and a torque transmission member is interposed between said inner ring and said outer member, whereby a predetermined torque is generated by a friction generated between said inner ring and said torque transmission member, when said inner ring and said outer member rotate relatively to each other containing a lubricating oil to be impregnated with said members on each other, said lubricating oil consisting essentially of a base oil, an emulsifier added to said base oil And a wear resistant agent, wherein said base oil consists of synthetic saturated hydrocarbon oil having a kinematic viscosity of 500 to 1200 mm.sup.2/s at 40. degree. C., wherein said emulsifier is added to said base oil of said lubricating oil as a solution dissolved in a solvent not generating a chemical attacking property.

2. A torque limiter according to claim 1, wherein said wear-resistant agent is a phosphate ester.

3. A torque limiter according to claim 2, wherein said phosphate ester is shown by a chemical formula below:

(RO)$_3$P=O wherein R denotes an alkyl group, an alkenyl group or aryl group.

4. A torque limiter for use in office appliances in an environment having a high temperature and a high humidity, having an inner ring is fitted inside an outer member and a torque transmission member is interposed between said inner ring and said outer member, whereby a predetermined torque is generated by a friction generated between said inner ring and said torque transmission member, when said inner ring and said outer member rotate relatively to each other containing a lubricating grease to be impregnated with said members on each other, said lubricating grease consisting essentially of a base oil, an emulsifier, a thickener both added to said base oil and a wear resistant agent, wherein said base oil consisting of synthetic saturated hydrocarbon oil having a kinematic viscosity of 500 to 1200 mm.sup.2/S at 40. degree. C. and an emulsifier and a thickener both added to said base oil wherein said emulsifier is added to said base oil of said lubricating oil as a solution dissolved in a solvent not generating a chemical attacking property.

5. A torque limiter according to claims 1 or 4, wherein said emulsifier is a metallic salt of sulfonic acid.

6. A torque limiter according to claim 5, wherein said metallic salt of sulfonic acid is shown by chemical formula below:

(RSO$_3$) nM wherein R denotes an alkyl group, an alkenyl group, and alkyl benzene; M denotes metal: n denotes 1 or 2.

7. A torque limiter according to claim 4, wherein said emulsifier is a metallic salt of sulfonic acid.

8. A torque limiter according to claim 7, wherein said metallic salt of sulfonic acid is shown by a chemical formula below:

(RSO$_3$)nM wherein R denotes an alky group, an alkenyl group, and alkyl benzene; M denotes metal: n denotes 1 or 2.

9. A torque limiter according to claim 4, wherein said wear-resistant agent is a phosphate ester.

10. A torque limiter according to claim 9, wherein said phosphate ester is shown by a chemical formula below:

(RO)$_3$P=O wherein R denotes an alkyl group, an alkenyl group or aryl group.

* * * * *